(12) United States Patent
Kerdemelidis (10) Patent No.: US 9,189,932 B2
(45) Date of Patent: Nov. 17, 2015

(54) HAPTIC NOTIFICATION APPARATUS AND METHOD

(71) Applicant: Andrew Kerdemelidis, London (GB)

(72) Inventor: Andrew Kerdemelidis, London (GB)

( * ) Notice: Subject to any disclaimer, the term of this patent is extended or adjusted under 35 U.S.C. 154(b) by 77 days.

(21) Appl. No.: 14/073,863

(22) Filed: Nov. 6, 2013

(65) Prior Publication Data

US 2015/0123775 A1 May 7, 2015

(51) Int. Cl.
*G08B 6/00* (2006.01)
*G06F 3/041* (2006.01)
*G06F 3/01* (2006.01)

(52) U.S. Cl.
CPC *G08B 6/00* (2013.01); *G06F 3/016* (2013.01); *G06F 3/0412* (2013.01)

(58) Field of Classification Search
CPC . A61N 1/37264; A61N 1/375; A61N 1/0558; A61N 1/3756; A61N 1/0504; A61N 1/37205; C07K 14/705; G01N 2500/00; G01N 2800/2842; G01N 2800/52; G01N 33/6872; G01N 33/6896; C07D 417/12; C07D 233/64
USPC .............. 340/407.2, 538.16, 691.2, 428–429, 340/514–515, 525, 530, 535, 545.4, 562, 340/686.6, 691.6, 692
See application file for complete search history.

(56) References Cited

U.S. PATENT DOCUMENTS

| | | | |
|---|---|---|---|
| 7,924,144 B2* | 4/2011 | Makinen et al. ........... 340/407.2 |
| 8,204,607 B2* | 6/2012 | Rooney et al. ................. 607/130 |
| 2004/0095311 A1* | 5/2004 | Tarlton et al. .................. 345/156 |
| 2009/0217316 A1* | 8/2009 | Gupta .............................. 725/32 |
| 2012/0134489 A1* | 5/2012 | Hillier et al. .............. 379/399.01 |
| 2014/0065967 A1* | 3/2014 | Shen ............................ 455/41.2 |
| 2014/0136629 A1* | 5/2014 | Nguyen ........................ 709/206 |
| 2014/0181222 A1* | 6/2014 | Geris et al. .................... 709/206 |

* cited by examiner

*Primary Examiner* — Daniel Previl (57) ABSTRACT

The present invention relates generally to a haptic notification apparatus and method which allows a user to be notified through a haptic interface allowing notifications to be perceived by a user as coordinated sensations. Preferably, the coordinated sensations are generated by providing a plurality of conducting electrode having at least one insulator per electrode, allowing skin nerve endings of user to be stimulated via capacitive coupling over said insulator. The apparatus and method also preferably includes a sensor which is configured to sense movement or rotation in any axis and sense electronic nerve signals or pressure from muscle contractions in order to allow a user to respond to a haptic notification.

15 Claims, 3 Drawing Sheets

HAPTIC NOTIFICATION APPARATUS AND METHOD

FIELD OF THE INVENTION

The present invention relates generally to a haptic notification apparatus and method Particularly, but not exclusively, the invention relates to an apparatus and method, which allows a user to be notified through a haptic interface allowing notifications to be perceived by a user as coordinated sensations.

BACKGROUND OF THE INVENTION

Social network updates via handheld mobile devices are a popular way for users to be notified of activities and status updates from their social and professional networking, as well as news and other websites that send regular or real-time notifications. Many mobile device applications provide a way of replying to a status updates, and also of generating status updates which include GPS locations.

A disadvantage of receiving notifications via a handheld mobile device is that the device normally has to notify the user with a disruptive method that can be heard or perceived by others around, then removed from the pocket, then sometimes must be 'unlocked' to view these notifications and reply to them using an on-screen keyboard interface. Additionally, this can be a slow process, as the user must usually unlock their device, bring up the notification together with the keyboard interface, type their reply, and then have to send it.

Most non-visual notification methods involve audio, even those which have motor-driven 'buzzers' make noise, and can be disruptive in quiet environments, importantly, they offer no refined way of notifying the user of activity requiring their attention in a completely private way. Another disadvantage is that these feedback mechanisms are limited in their ability to provide for different user notifications or to present a user interface to the user that is dependent on the context of the message received.

Therefore, there is a need for a haptic notification and response apparatus and method to overcome these deficiencies in the prior art.

SUMMARY OF THE INVENTION

The present invention relates generally to a haptic notification apparatus and method.

In a first aspect the invention provides a haptic notification apparatus comprising:
a wireless module configured to communicate with a wireless network;
a haptic interface proximal to the skin of a user configured to transmit a plurality of haptic stimuli perceived as a coordinated sensation on the skin of said user;
a processor configured to encode a notification transmitted across said wireless network as a plurality of haptic stimuli perceived as said coordinated sensation on the skin of said user.

In a second aspect, the invention provides a method for haptic notification, the method comprising:
providing a wireless module configured to communicate with a wireless network;
providing a haptic interface proximal to the skin of a user configured to transmit a plurality of haptic stimuli perceived as a coordinated sensation on the skin of said user;
providing a processor configured to encode a notification transmitted across said wireless network as a plurality of haptic stimuli perceived as said coordinated sensation on the skin of said user.

In a third aspect, the invention provides a haptic notification method comprising:
providing a haptic interface proximal to the skin of a human being configured to transmit a plurality of haptic stimuli perceived as a coordinated sensation on the skin of said human being;
providing a touch-sensitive screen in wireless or direct connection to said haptic interface;
providing a processor configured to provide tactile feedback as said coordinated sensation in response to actions performed by a body part touching said touch sensitive screen.

Preferably, a sensor is provided which is configured to detect at least one physical action by a user to respond to said notification.

A notification includes status updates from social networking and web application accounts.

Processor may be configured to encode said coordinated sensation to substantially correspond with a sequence of movement applied to a touch-sensitive screen by a body part.

Coordinated sensation can be perceived as individual letters or symbols.

Feedback may include a coordinated sensation of pulsed stimuli which encodes a movement of a body part in either direction on a rolling index on said touch sensitive screen.

Feedback may further include a coordinated sensation which encodes the spatial location of a button or keypad on said touch-sensitive screen and/or a tap by user on said-touch sensitive screen.

Processor may be configured to encode said coordinated sensation to substantially correspond to a sequence of movement applied to a touch-sensitive screen by a remote user from a remote device and digitally rendered for communication across said wireless network.

Processor may control the intensity and/or speed of perceived movement and/or location of said haptic stimuli in accordance with pre-defined criteria including the sender and/or contents of said notification.

Response sent from a user may automatically include information regarding the user such as location and availability, or at least one pre-selected response from a plurality of available responses.

Haptic notification apparatus may include a persistent screen configured to use power only when altering the features shown on said screen.

Sensor may be configured to sense movement or rotation in any axis and sense electronic nerve signals or pressure from muscle contractions. The processor may be configured to navigate and/or read and/or respond to said notification in response to said actions detected by said sensor, either individually or in combination.

Haptic interface may be configured to produce an electrosensory sensation to said body member by providing a plurality of conducting electrodes.

Haptic interface may be configured to provide haptic stimuli which activate sensory nerves under skin of said user.

Conducting electrodes may be provided with at least one insulator per electrode, wherein said insulator prevents flow of direct current from the conducting electrodes to skin of said user to be stimulated and a capacitive coupling over said insulator is formed between said conducting electrodes and the skin of said user.

Conducting electrodes may be connected to an electrical source providing an electrical input at a frequency and voltage configured to selectively stimulate the sensory nerves under the skin of said user, said sensory nerves comprising a group including thermoreceptors and mechanoreceptors.

Notifications may be received through a haptic or tactile interface in contact or in close proximity with the skin, which vary according to message type, message urgency and message content. A user may use gestures, which include movement or rotation in any axis, which can optionally be combined with the reading of electronic nerve signals or pressure from muscle contractions in order to navigate, read messages or respond to any notification. The apparatus is intended to be held in the hand, worn or attached to a part of the body.

More specific features for preferred embodiments are set out in the description below.

OBJECTS OF THE INVENTION

It is an object of the present invention to provide an apparatus and method for informing a user silently using haptic technology about the nature and/or content of status updates and messages received.

It is a further object of the present invention to provide an apparatus and method which allows a user not to have to interrupt any other activity in order to check said messages or status updates, or determine if a received message requires urgent attention or response.

It is a further object of the present invention to allow a user to aggregate notifications from social media streams and updates, and choose a physical notification method including, preferably, discernible haptic signals that can be felt and discriminated by a user, and convey information about the nature of a notification, such as its urgency, or message type and, optionally, these haptic notification signals combined with visual and/or audio notification.

It is a further object of the present invention to provide a context-sensitive way to reply to updates rapidly through an interface combining automatic loading into the reply interface of a standard response template, gestures (picked up via accelerometer or through sensing muscle flexure) or a touch-interface, and additionally, the reply templates may be context sensitive, which means that they can load a specific reply template, and can include information that conveys specific a specific reply context, including the location and/or status of the user.

Further objects and advantages of the present invention will be disclosed and become apparent from the following description. Each object is to be read disjunctively with the object of at least providing the public with a useful choice.

BRIEF DESCRIPTION OF THE DRAWINGS

The invention will now be described by way of example only with reference to the accompanying drawings, in which.

DETAILED DESCRIPTION OF THE INVENTION

Various embodiments of the present invention are described hereinafter with reference to the figures. It should be noted that the figures are only intended to facilitate the description of specific embodiments of the invention. In addition, an aspect described in conjunction with a particular embodiment of the present invention is not necessarily limited to that embodiment and can be practiced in any other embodiments of the present invention.

The present invention relates generally to a wrist-wearable portable notifier, which displays and notifies the user through preferably haptic or tactile mechanisms, but also audio and visual methods, allowing notifications from, but also responding to, digital 'status' updates from a users' social networking, news and other web or mobile phone application accounts which receive and send digital feed or 'status' updates ('feeds'). The device could also be used to receive notifications and control or respond to household appliances or other wireless digital devices that would benefit from a silent notification system, for example, a microwave oven signaling that food is now ready, or a landline telephone notifying the user of a call, or an electric vehicle notifying the user that it is now fully charged, or a doorbell. The device also allows, where appropriate, a simple way to reply or respond to these updates. The device allows users to receive and perceive notifications through a haptic or tactile interface that is worn on the wrist or in direct contact with the skin or other part of the body, or indirectly in close proximity (through clothing or through an enclosure) to any part of the body.

A novel haptic interface is presented, which provides both simple notifications and also more complex haptic notifications that can convey specific information to the user, such as device type (the device issuing the notification) message type, message urgency and message content. A user may use gestures, which include movement or rotation in any axis, which can optionally be combined with the reading of electronic nerve signals or pressure from finger or wrist muscle contractions in order to navigate, read messages or respond to any notification. In addition to this, this haptic notification and feedback device does not have to be worn, but can be incorporated into an existing handheld computing or mobile smartphone device, in order to provide haptic feedback interface to the user when the device is being held in contact with the skin. The invention specifically pertains to haptic feedback and notifications on areas of a device other than only on the area where a display or screen is present, or for a device intended to be held in the hand, worn or attached to a part of the body. For example, the invention can be incorporated into the wristband of a watch, the back and/or sides of a mobile smartphone, to make the device feel more tangible, or to provide for silent non-visual and non-audio notifications.

The present invention relates generally to a body-wearable portable device, which aggregates, displays, notifies the user through haptic, but also audio and visual methods, and allows responses to digital notifications including 'status' updates from a users' social networking, news, intelligent appliance, web application accounts or mobile phone applications which receive and send digital feed or 'status' updates (feeds), and allows a simple way to reply to these notifications with minimal user intervention, using a novel haptic and gesture interface. Furthermore, this device can be built as haptic-only, or with a persistent display, preferably of a type that only requires energy to change what is displayed on the screen (such as an e-paper display). This makes it easier for a user notified through the haptic interface to view additional status information in a glance without having to 'unlock' the device, while conserving battery life, since persistent displays such as e-paper do not require energy to maintain display content, only to change display content.

Preferably, the device is connected via a wireless data network to a wireless data subscription, such as a cellular mobile phone network (2G, EDGE, 3G, 4G) or WiFi/WiMAX network, or alternatively a Bluetooth connection, 802.11 (WiFi), ISM (Industrial, Scientific and Medical) connection, ZigBee, Infra-Red connection, or other equivalent wireless data transfer method, capable of transmitting and/or receiving digital and analogue information, so that the device can receive instructions to notify the user of activity requiring their attention, and receive updates preferably by 'push' notifications (where a local device, or remotely located, Internet-connected software application is able to notify that there are notifications, messages, or status updates in real-time, and is able to 'push' these onto the device). Alternatively the device may operate using a 'pull' method, where the device polls the device, or Internet-connected software application at various time intervals in order to request and download any notification updates which trigger the notification to be generated for the user. Preferably, the user is notified of status updates in the first instance through a haptic and/or tactile signal that the user can feel, and of which the user can differentiate between haptic/tactile signal types in order to determine the type and nature of said messages or status updates. Optionally, the said messages or status updates may also be displayed on a display, preferably a persistent e-paper display, where the user can view the status updates and interact. The display might be an e-paper display type, but alternatively may also be a low-power LCD, OLED or other non-persistent display.

Preferably, a user can also respond or reply to feeds and updates by way of a gesture interface that uses movement and/or electrical signals picked up from muscle contractions. Responses may also alternately be composed through a touch interface that allows replies/status updates to be rapidly composed and sent, through an on-screen or off-screen keyboard, or alternately via a set of pre-set reply templates, which include text strings and emoticons. The device may also be sent, via the notification application located on the remote appliance or device, or via a web application, or be able to generate on its own, a templated and customized reply/response, ready for the user to send with a single movement, gesture or touch or other short instruction (i.e. verbal)—without the user having to actually compose the full content of the message. The device does not explicitly require a screen to operate, or for the user to respond or reply to messages. The response may include GPS coordinates or a 'check-in' location of the user, how much time the user will be there, where they are going next, a standard response to a greeting, whether the user is 'available' or 'busy', and cannot respond to calls or messages and other useful and commonly used responses which can be customized by the user if required.

In an embodiment of the invention, a remotely-located software application allows, via a web browser, mobile application, computer desktop application, on-device browser or firmware, the entry of a single secret alphanumeric identifier associated with the device, and the application can, optionally, connect the device to a user's third-party social networking and messaging accounts by the user registering on a website, or directly on their mobile phone, preferably by entering in login credentials from these accounts explicitly, or alternately by connecting through using proprietary or open-standards registration method such as OpenID or oAuth/oAuth2.0, (such as Facebook Connect ('Connect with Facebook'), Linkedin Connect, Twitter and many other websites and web applications use), in order to facilitate the consolidation of feed 'updates' from these accounts, such as 'event feeds', 'wall postings', 'microblogs', 'discussion updates', 'comments updates', 'chat', from social networking and web application accounts including, but not limited to Facebook, Twitter, Youtube, Linkedin, Bebo, Viadeo, Xing, Google, and other accounts offering such services (this includes any other social networking and social media accounts or services that offer 'status updates', 'news', 'messages' or other kinds of notifications). Preferably, the device is supplied with one or more secret 'keys' and/or digital certificates, which reside on the device either as a digital file, or through a smart card, SIM card, digitally signed certificate file or alphanumeric passcode. It is this secret key or certificate which immediately and securely enumerate the device with the aggregating application or web application user account that the user has registered their social feed accounts with. The user is also able to set (via the web application, remote device software application, or through the user interface of the device) which exact feeds are sent as notifications to the device over a wireless connection, and the manner in which the user wearing or attached to the device, would be notified. This includes selecting the specific accounts or services, to the level of granularity that allows setting individual users, and the type of status update to receive updates from, and being able to include searches for keywords or symbols in the status update (such as words tagged with a hash, or other ascii symbol, or word combination), which the user could use to set properties of the notification—for example, to trigger a notification that conveys urgency to the user by modifying the intensity or type of haptic signal sent to the user. The user can also set what the type of notification or haptic user feedback signal to be felt by the user will be for new feed items, depending on what type of status update the new feed item is—so that the user may discern between news items, status updates, messages from a user, incoming phone calls and the like. The notification type may be a combination of one or more motor vibrators, specific electrical stimulation of areas of skin in which the device is in contact with, or in combination with these notifications, an audio sound, LED or OLED light, or an on-screen notification. The user is also able to set the interval that the device receives updates (either through the device user interface, connected mobile device, or through the web site application) to receive and render any new feeds at a specific, polled update interval, or as 'push' notifications.

The device is designed to be worn or placed on the skin, with the haptic interface designed to make contact with an area of the body. The device could, for example, be worn around the neck, or around one or more fingers, or worn on the wrist or forearm like a wristwatch. It could also be placed onto the top of the hand, or stuck on with a temporary adhesive to any part of the body. This allows an array of individually actuated and controlled electrodes or capacitive coupling plates to be used to pass a controlled current waveform through the skin, the intent of which is to stimulate nerve endings in the area for the purpose of effecting a haptic interface. There are several different types of nerve endings under the skin which are receptive to stimulation such as vibration (Pacinis corpuscles), touch (Meissner's corpuscles), pain, heat, and cold (end-bulbs of Krause). It has been demonstrated that different kinds of current waveforms passing through the skin, together with a specific depth of stimulation implemented. For example, under the principle of capacitative coupling, an insulator between the skin and electrode can be used to create a localised sensation or feeling of pressure (refer to U.S. Pat. Nos. 7,924,144, 7,982,588, and 8,174,373 by Senseg Limited, which are hereby incorporated by reference). The electrical range where Pacinian corpuscles (pressure sensors) are stimulated is a frequency range between 10-1000 Hertz, preferably between 50-500 and optimally between 100-300, e.g. 240 Hz. This will produce a sensation of apparent vibration.

The array of electrodes is a multitude of one or more conductive points or plates, which can be made from any conductive material, including but not limited to carbon, metals or conductive metal compounds, conductive polymers, silicon. In one embodiment, the electrodes can be conductive points in direct contact with the skin, and which are able to transfer current directly to the skin, including both direct current (DC) and specific pulsed or alternating current (AC) waveforms. In an alternative embodiment, the electrodes are one or more conductive plates separated from the skin by an insulating barrier, so that current is only carried through the skin by capacitive coupling. The benefit of capacitive coupling is that it will only permit the conduction of alternating current waveforms, and involves having one or more conductive plates, which do not have to be directly in electrical contact with the skin, being driven with an alternating voltage source waveform. Human skin itself is a weak conductor of electricity, the conductivity of which depends on the depth and varies with the physiology and current state of the individual and their environment. Skin is practically an insulator, so the plates do not necessarily have to be insulated from the skin, and capacitive coupling may be effected with conductors placed directly on the skin with or without the insulating barrier. Preferably, however, the plates would reside behind a thin insulating barrier, constructed either from generating a passivating layer on a metallic surface (such as aluminium oxide on aluminium metal) or simply by being placed behind a thin insulating material so that little or no direct current can pass through the plates, for example, as copper circuit traces on a polytetrafluoroethylene substrate ('Capton' tape), or polyethylene substrate. A combination of conductive and non-conductive plastics can also be used to create an array of capacitive coupling plates or skin-contacting electrode array. The purpose of using capacitative coupling is that it makes the device safer (for example, a malfunction of the device cannot pass direct current through the skin, and also is intrinsically a current-limiting form factor, which limits the depth of where current can flow in and under the skin (when considering the "skin effect" and also the maximum area of plate contact that is possible, and that the skin has finite depth, and limiting the alternating potential difference between the conductive plates in an array) and also means that the body is not in contact with electrical conductors that can pass through a current that might interfere with medical devices connected directly to the body, such as pacemakers or heartbeat sensors. Another problem with directly connected electrodes is that if the contact area varies, even if the haptic device regulates the current through the electrode to be specific, it is difficult to control the sensation that will be felt by the user. For the same current flow through the skin, a smaller contact area would, in many cases, generate a more intensely felt sensation. This is because the current density over a smaller contact area is higher, and may, for example, be far above what is required to moderately stimulate localized nerve endings in that area. Conversely, a larger contact area would for the same current, in many cases, generate a much weaker sensation, the current flow being distributed over a wider area, and therefore may be under the threshold that could stimulate and be felt by localized nerve endings. Another advantage that is realized if the device is not directly electrically connected to the body is that it is likely to make it easier for the device to conform to any relevant regulatory requirements.

The haptic interface is a system that allows driving specific electrical signals into the skin through said electrodes or via capacitive coupling, and allows synthesis of both static and 'moving' haptic feedback. This means that although the device is held in the hand, statically placed or stuck using a material that acts as a temporary adhesive onto the skin, it is able to generate a feeling of moving haptic feedback. For example, by selectively stimulating areas of the skin using electrical AC current designed to stimulate nerve endings that sense 'pressure', and moving where this stimulation is felt by activating a row of electrodes in sequence (refer to Figures below), the user would feel like their skin was being stroked underneath the haptic device, or that the device is moving, even though the device actually remains static. As another example, the device could generate the feeling of a cold item being tapped against the skin by turning on and off an electrical signal that stimulates the nerve endings with the sensation of 'cold', and the area where the sensation was felt could be moved to anywhere the individually controlled electrodes or plates were located. It would also be possible to incorporate custom haptic sensory signals, so that a user can use a touch screen and interface to synthesise their own kinds of haptic feedback, and set this up as a custom notification of their own, or send wirelessly through to another user wearing a haptic notifications interface. It is also possible to provide feedback to the user when they operate a touch-screen on the device, so that the user feels the kinetic scrolling of a user interface rolling over their skin, or feels a tap when dismissing a pop-up menu or notification appearing on the display.

An advantage of being able to 'animate' haptic sensory notifications and feedback is that the user is able to learn how to interpret the notifications or feedback, in order to discern between, for example, an email message that is urgent versus a non-urgent email, a voicemail text alert versus a text message from a friend, a calendar notification for an upcoming appointment, versus the notification that someone they were waiting for has arrived and is waiting for them. Haptic feedback can be used to indicate to the user if there are messages remaining to be read, provide the feeling of another message appearing on a stack of messages they can feel as pressure under their device, and then animated so a message or notification 'disappearing' when they have read or dismissed it. A specific embodiment allows a user wearing a device on their wrist to feel themselves scrolling through their contacts in the manner of a 'Rolodex' (see FIG. 4A below), as if their wrist was the actual Rolodex, which is a much more tangible and intimate way than if there was no haptic feedback, and only a touchscreen interface on the display.

As an alternative embodiment, the electronic haptic stimulator can be used in combination with other haptic, audio and visual feedback mechanisms—for example, an array of one or more vibratory motors may be placed in the device, or an array of resistors or small peltier devices that can generate a localized hot or cold sensation to augment the sensory experience, or an array of one or more lights or displays to effect a combined visual notification.

Preferably, the current waveforms that are generated and passed through the skin are controlled by an electronic modulator which incorporates a method of generating a varying potential difference between the electrode (or capacitive coupling plates), and the skin which it contacts. It is necessary to control the current waveform in order to generate the correct nerve stimulation signal required for a user to subjectively experience a particular haptic effect. This is because the nerve endings that are responsible for detecting and communicating particular sensations are present under the skin at specific depths (refer to FIG. 1), and require a specific electrical signal in order to 'fire' and be perceived as a specific type of feeling by the brain. For example, there are specialized nerves which detect vibration (Pacinis corpuscles), touch (Meissner's corpuscles), pain, heat, and cold (end-bulbs of Krause). Each nerve ending has been shown to be able to be stimulated by a specific frequency and current, effecting a specific potential difference waveform at the boundary of the nerve ending and skin cells (for example 0.3 v potential at 300 hz pulse generates feeling of 'pressure' as discussed in the Senseg Ltd patents, referenced above). To generate current at a specific depth, an effect known as the 'skin effect' is employed. It will be apparent to those skilled in the art, that using a high frequency voltage source connected to electrodes or capacitive coupling plates, it is possible to limit the flow current to a certain depth under the skin, according to a formula for determining the 'skin depth' in a solid conductor through which a high frequency alternating current is flowing. Such formula will have regard to the resistivity of skin which also varies across its depth. An example is given for how to selectively stimulate nerve endings. An example of how to selectively stimulate Pacinian corpuscles is illustrated in the Senseg patents, incorporated herein by reference. There will be natural variation of this depth between individuals, and the amount of stimulation required for them to perceive a particular haptic signal generated by the device, and this will also depend on the location on the body where the haptic stimulators are placed, so it may be necessary to calibrate the haptic signals to best suit a particular individual. In addition to this, it is necessary to modulate this current at 240 Hz in order to fire the nerve endings in a way that creates the sensation of pressure to a user, so the high-frequency waveform that generates an alternating current at the correct depth must also be amplitude-modulated at 240 Hz. A voltage source with a current sensor and limiter is used to ensure that the current stays at the level required to correctly stimulate the nerve endings.

An advantage of using high-frequency current signals is that they can be conducted indirectly through capacitive coupling to the human body through the skin. This means that a flat conductive electrode with an insulating layer between the skin and the electrode can be used to generate an electric charge under the skin (see FIG. 1 below). The advantage of capacitive coupling is that the safety of the haptic device is greatly improved, since there are no electrodes in direct electrical contact with the skin. This means that direct current is unable to flow between electrodes, as is any current that is not sub-modulated to a high enough frequency that allows it to pass through the capacitive coupling plates. This simplifies any regulatory compliance that may be required of a device intended to be connected to the human body, and minimizes any effects that the haptic device will have on medical or other devices that incorporate electrodes that connect directly to other parts of the body, for example, pacemakers.

The invention can optionally incorporate a persistent screen, where the screen is of a low-power type. E-paper or similar technology would be ideal in one embodiment. This allows for a persistent display of information, without the need to continually power the display. This would allow the device to only consume power when it was updating a notification for the user to see. The user may then glance at the area where they are wearing the haptic device, in order to read the latest information that has been sent to them, without the device display consuming any more power. For example, after being notified through the haptic interface that a text message has arrived, the text message is sent to the device and persistently displayed on the screen where it may be read by the user at a convenient time. In devices where the display is of a sufficient area, for example, where it is incorporated as a display that is wrapped completely around the wrist of a user, the haptic notifications can localize where the notification has been displayed, so that the user can know where to glance (for example, see FIGS. 4A and 4B below)

Once a message notification has been given, or the message has been read, as an augmentation to the embodiment of the invention, a template reply can be prepared on the device without user intervention. Therefore the message can be either immediately answered, acknowledged or dismissed using a simple interface on the device. This interface can be incorporated as a combination of one or more of the following: A touch-screen with or without a finger-pressure sensor (shown in FIGS. 1-4 below) a small button array (see FIG. 2 below), a motion sensor module comprising of accelerometers and/or gyroscopes, a microphone (see FIG. 1 below) which can be used to compose a recording by the user that will be sent wirelessly, or, by way of voice recognition that is rendered either on the haptic device itself, on an associated mobile device, or via a service delivered via a web application through the Internet or wireless/mobile network, will allow a user to prepare an instant reply, which can incorporate elements of text, haptic and audio/visual notification signals, location information, information from sensors such as temperature, altitude, skin conductivity, heartbeat, or audio or video reply content (see FIG. 1 below). The reply interface can be configured so that replies are instantly sent without user intervention.

The features and operation of the preferred and alternative embodiments of the invention will now be illustrated with reference to FIGS. 1-5.

Figure 1:
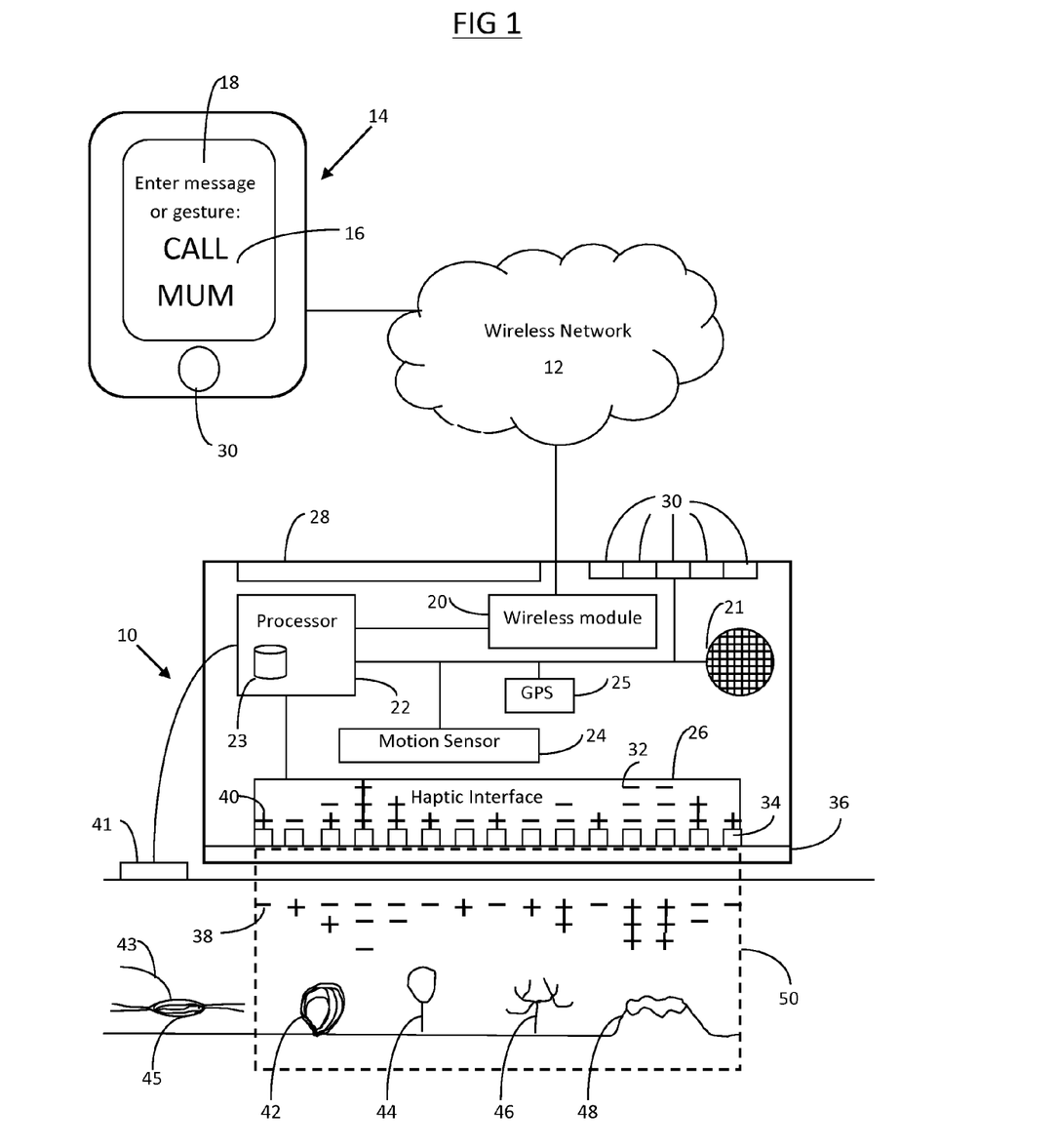
FIG. 1 shows a block diagram illustrating a preferred embodiment of the invention for sending a notification across a wireless network using a haptic interface.

FIG. 1 shows a block diagram illustrating a preferred embodiment of the invention 10 for sending a notification 16 across a wireless network 12 using a haptic interface 26. According to the preferred embodiment, a remote mobile device 14 with a touch-sensitive screen 16 can be configured to send a message or gesture 18 across a wireless network 12 as a notification. In this particular example, the notification is the message "Call mum" although such notification can comprise a notification with any content, including status updates from a social network such as Facebook or Linkedin. The wireless network is connected to the haptic notification apparatus 10 via a wireless module 20. The apparatus contains a processor 22, which is a microcontroller and memory 23 to interface between the apparatus and various other modules including the touch sensitive and/or persistent screen 28 configured to allow control of the apparatus via touch and/or displaying information in an energy-efficient manner, physical buttons 30 configured for allowing a user to control the apparatus, motion sensor 24 configured for allowing a user to control the device through motion, a microphone/speaker 21 configured to allow audio transmission and notifications, and a haptic interface 26 configured to use a series of electrodes 34 and insulator 36 to use capacitive coupling with the skin 19 of a user, in order to generate an electric field 50 to stimulate various nerves under the skin for example, a Pacinian corpuscle 42, for detecting pressure, a Meissner's corpuscle 44 for detecting touch, a pain nerve fibre 46 and a thermoreceptor 48 for detecting heat and cold. It should be noted that while the haptic interface 26 in the preferred embodiment uses electricity to stimulate nerves, it should be apparent to those skilled in the art that other methods of stimulation can be used. For example, electrodes 34 may be replaced partially or wholly by extendible pins (which stimulate nerves by applying pressure), peltier elements (which stimulate nerves by cold or heat) or actuators (which stimulate the nerves by vibration). The preferred embodiment refers to electrodes 42 which are configured to generate a negative charge 38 and positive charge 40 at a voltage and frequency optimized to stimulate nerves 42-48, as discussed above in this specification. For example, a larger charge 32 will extend deeper into a user's skin 19 in order to stimulate deeper nerves such as thermoreceptors 48. If an alternative sensory modality is used to stimulate the nerves this can be optimized by varying the strength of the stimulation (e.g. level of vibration, heat/cold, pressure). Varying the stimulation by intensity and spatial location along the haptic interface 26 allows a coordinated sensation to be perceived on the skin 19. The processor 22 is also connected to a sensor 41 configured to perceive biofeedback information from a user, including nerve impulses conducted by a nerve 43 contracting a muscle 45. This allows a user to potentially control the apparatus through muscle contraction, e.g. contracting a finger a specified amount of times in a particular sequence. Alternatively, the sensor 41 can detect skin conductivity, heartbeat or skin flushing. This biofeedback information can be used to configure the apparatus to send a particular response to a notification 18, in accordance with the physiological state of the user. For example, a 'busy' response can be sent when the user is physiologically aroused or stressed. A GPS module 25 can also be used to convey automatic responses to notifications, including location information back to the remote mobile device 14. The processor 22 is configured to encode and decode notifications 18 as a coordinated sensation which is perceived on the skin 19 of a user via the haptic interface 26, in the manner discussed in the figures below.

Figure 2:
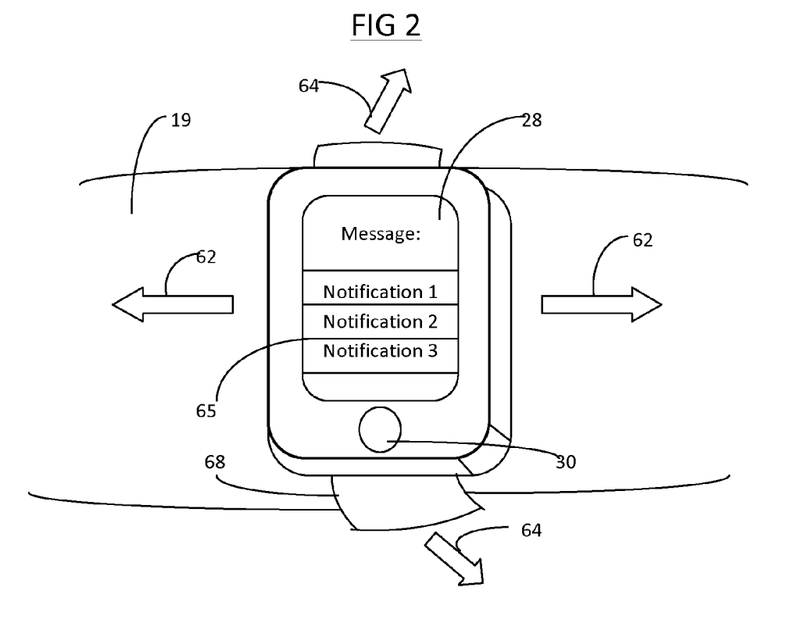
FIG. 2 shows a representation of an apparatus with touch screen and haptic interface proximal to the skin of a user.

FIG. 2 shows the preferred embodiment of the haptic notification apparatus 60 worn on the skin 19 of a user. The apparatus can be attached to the skin by means of a strap 68, although alternative means can be used to secure the apparatus and ensure the haptic interface (not shown) is proximate to the skin, such as an arm band or adhesive. Optionally, the apparatus 60 can be controlled by movement, for example, transverse movement 62 or rotational movement 64. Alternatively the apparatus can be controlled by a touch-sensitive and/or persistent screen 28 or physical buttons 30. In this example, the screen 28 is displaying three notifications 65.

Figure 3:
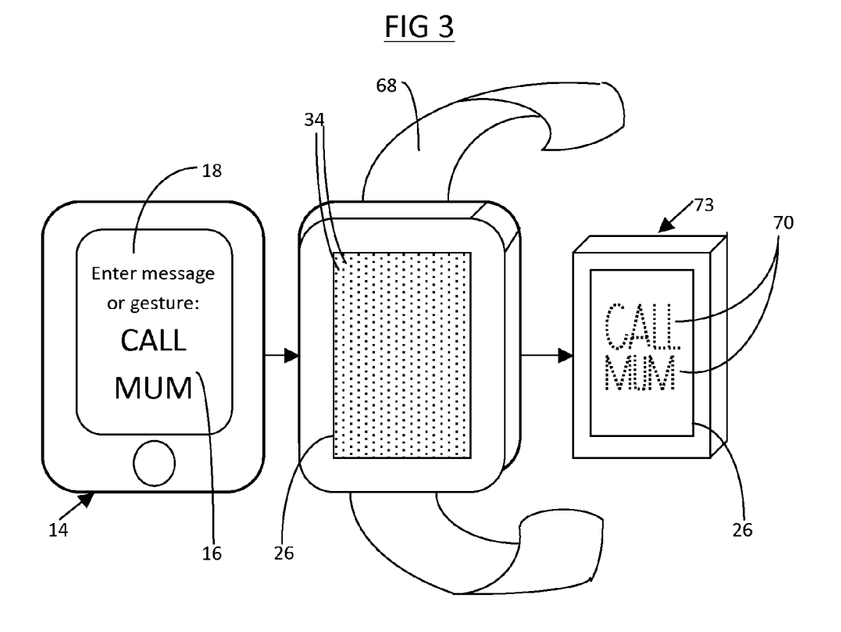
FIG. 3 shows an illustration of the method of encoding a notification on a remote mobile device and creating a coordinated sensation via the haptic interface of the invention.

FIG. 3 shows an illustration of encoding a notification 18 on a remote mobile device 14 and creating a coordinated sensation 70 via the haptic interface 28 of the invention. In this illustration, the notification "Call mum" is sent via a wireless network to the apparatus 60 which is shows the reverse side of the haptic interface 26 and electrodes 34 which were not shown in FIG. 2. As noted above, the electrodes 34 could be replaced by some other means of providing haptic stimuli, provided that they are capable of localizing the stimulus to a relatively small area or point. Reference numeral 73 shows a representation of the haptic interface 26 excluding the unstimulated electrodes, in order to provide an indication of how the coordinated sensation 70 is perceived by a user. It will be apparent to those skilled in the art that many different coordinated sensations can be used to convey useful information to a user.

Figure 4A:
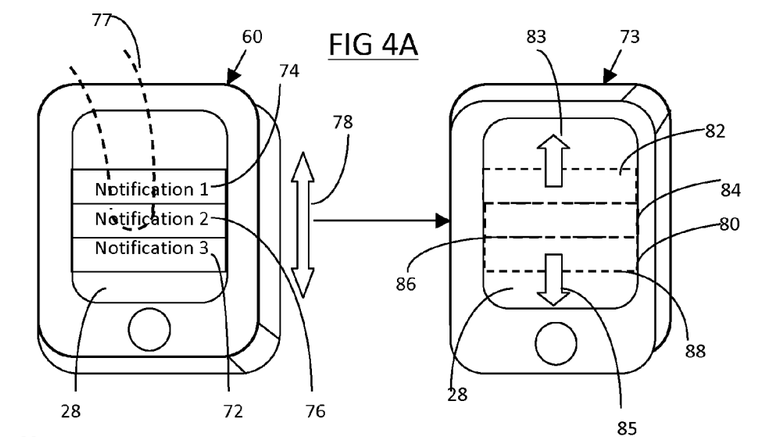
FIGS. 4*a* and 4*b* are representations of a touch-sensitive screen and haptic interface to illustrate how various coordinated sensations may be perceived by a user.
Figure 4B:
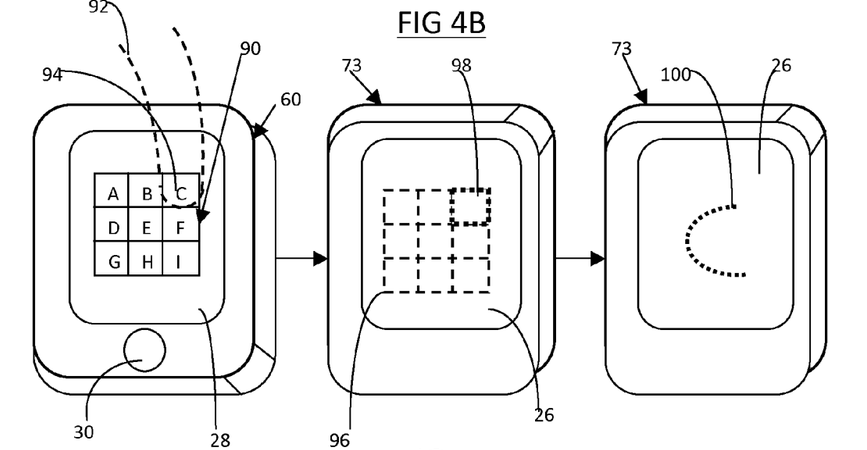

For example, FIGS. 4a and 4b are representations of a touch-sensitive screen 28 and haptic interface to illustrate how various coordinated sensations may be perceived by a user. FIG. 4A shows an apparatus 60 with a touch-sensitive screen 28 displaying three notifications 72-76 by simulating a 'rolodex' image which can be 'scrolled' in either direction 78. Reference numeral 73 shows a representation of the haptic interface 26 excluding the unstimulated electrodes, in order to provide an indication of how the coordinated sensation is perceived by a user. The perception of a rectangular box 84 represents the central notification 76, with other boxes 82 and 80 corresponding to notifications 74 and 72 respectively. The rolodex image on the touch-sensitive screen 28 can be 'rotated' in an upwards direction or downwards direction by the finger 77 which is perceived as a coordinated sensation in the upwards direction 83 or downwards direction 85 respectively. Preferably, the coordinated sensation can facilitate the imitation of rolodex by ensuring that when a notification box 84 is 'scrolled' into the centre of the screen 28, the stimulation on the electrodes is increased 86, whereas the stimulation on the electrodes is decreased 88 for notification boxes 80 and 82. The 'scrolling' of the notification boxes by a finger 77 is also perceived as movement along the haptic interface 26. The end result is that the user can sense the location of the notifications on the screen and also when a notification is in the centre of the screen, which allows manipulation of the notifications even when not looking directly at the screen. It will be apparent to those skilled in the art that the notifications may have use other means to discern their contents and status which is communicated by a coordinated sensation which varies in spatial location or intensity or some other combination of the two. FIG. 4B shows a similar arrangement to FIG. 4A, although the touch-screen 28 is showing various keys on a simulated keyboard 90. It should be apparent to those skilled in the art that while only some keys are shown in this figure, it is possible for a touch screen to represent all the keys on a keyboard. After the finger 92 of a user presses a key 94, shown here as the letter "C", reference numeral 73 shows a representation of the haptic interface 26 excluding the unstimulated electrodes, in order to provide an indication of how the coordinated sensation is perceived by a user. This coordinated sensation is perceived as a series of squares 96, which correspond to the keys on the simulated keyboard 90. The pressed key 94 results in an increased level of stimulation 98 which provides haptic feedback to the user confirming the location and fact the key has been pressed. Alternatively or subsequently, the haptic interface can provide a coordinated sensation representing the letter "C", which is perceived by a user. It should be apparent to those in the art that the arrangement shown in FIG. 4B can facilitate sending of a text message without a user having to look at the screen 28. The user may also be able to perceive a text message sent from a remote device 14 (not shown) and respond to the same, while not having to look at the screen 28. This is a vast improvement on prior art devices and may also be of great use to users with visual problems or blindness.

Figure 5:
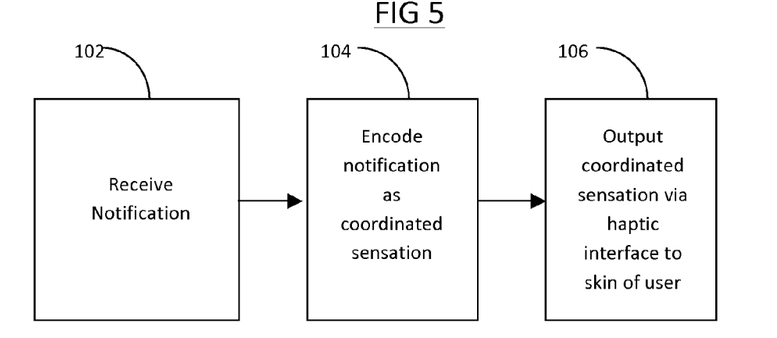
FIG. 5 is a flow diagram showing the operation of a preferred embodiment of the invention.

FIG. 5 is a flow diagram showing the operation of a preferred embodiment of the invention. In the first step 102, a notification is received (either via a wireless network from a remote mobile device 14 or in response to inputs by a user on the touch screen 28 of the apparatus 60). In the next step 104, the notification is encoded in a manner which allows it to be transmitted and outputted as a coordinated sensation. In the final step 106, the encoded notification is outputted as a coordinated sensation via a haptic interface to the skin of a user, allowing a user to perceive a notification as a haptic stimulus. As discussed in this specification above, the disclosed invention allows a user to manipulate the received notifications and send a fast and efficient response with a minimum of disruption and without needing to look at the screen of the apparatus. This is a vast improvement over existing prior art mobile devices and allow a user to stay connected to their social and professional network, while minimizing the disruptiveness of continuous notifications, with a corresponding improvement in efficiency and productivity.

While the invention has been illustrated and described in detail in the foregoing description, such illustration and description are to be considered illustrative or exemplary and non-restrictive; the invention is thus not limited to the disclosed embodiments. Features mentioned in connection with one embodiment described herein may also be advantageous as features of another embodiment described herein without explicitly showing these features. Variations to the disclosed embodiments can be understood and effected by those skilled in the art and practicing the claimed invention, from a study of the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A haptic notification apparatus comprising:
a wireless module configured to receive a notification having certain contents over a wireless network from a remote device; a physical haptic interface proximal to the skin of a user configured to transmit a plurality of haptic stimuli perceived as a coordinated sensation on the skin of said user; and a processor configured to modulate said coordinated sensation on the skin of said user in a pre-defined manner in accordance with the contents of said notification.

2. The apparatus of claim 1, further comprising a sensor which is configured to detect at least one physical action by a user in order to navigate and/or read content of said notification and/or respond to said notification.

3. The apparatus of claim 1, wherein said processor is configured to encode said coordinated sensation to substantially correspond with a sequence of movement applied to a touch-sensitive screen by a body part on said remote device.

4. The apparatus of claim 1, wherein said processor is configured to modulate the intensity and/or speed and direction of perceived movement and/or spatial location of said coordinated sensation on said haptic interface in accordance with the contents of said notification including the generation of a static or dynamic perception of specific letters, symbols or shapes on the skin of said user.

5. The apparatus of claim 1, wherein said haptic interface is configured to produce said coordinated sensation by providing a plurality of conducting electrodes which activate sensory nerves under skin of said user.

6. The apparatus of claim 5, wherein said conducting electrodes are connected to an electrical source providing an electrical input at a frequency and voltage configured to selectively stimulate the sensory nerves under the skin of said user, said sensory nerves comprising a group including thermoreceptors and mechanoreceptors.

7. The apparatus of claim 5, wherein said conducting electrodes are provided with at least one insulator per electrode, wherein said insulator prevents flow of direct current from the conducting electrodes to the skin of said user and a capacitive coupling over said insulator is formed between said conducting electrodes and the skin of said user.

8. A haptic notification method, the method comprising:
providing an apparatus having a physical haptic interface proximal to the skin of a user configured to transmit a plurality of haptic stimuli perceived as a coordinated sensation on the skin of said user;
receiving a notification over a wireless network from a remote device to said apparatus; and
encoding said notification transmitted across said wireless network to apparatus as a plurality of haptic stimuli perceived as said coordinated sensation on the skin of said user.

9. The method of claim 8, further including the steps of providing a sensor which is configured to detect at least one physical action by a user in order to navigate and/or read content of said notification and/or respond to said notification.

10. The method of claim 8, wherein said coordinated sensation is encoded to substantially correspond with a sequence of movement applied to a touch-sensitive screen by a body part on said remote device.

11. The method of claim 8, wherein the intensity and/or speed and direction of perceived movement and/or spatial location of said coordinated sensation on said haptic interface is modulated in accordance with the contents of said notification including the generation of a static or dynamic perception of specific letters, symbols or shapes on the skin of said user.

12. The method of claim 8, wherein said haptic interface produces said coordinated sensation by providing a plurality of conducting electrodes which activate sensory nerves under skin of said user.

13. The method of claim 12, wherein said conducting electrodes are connected to an electrical source providing an electrical input at a frequency and voltage configured to selectively stimulate the sensory nerves under the skin of said user, said sensory nerves comprising a group including thermoreceptors and mechanoreceptors.

14. The method of claim 12, wherein said conducting electrodes are provided with at least one insulator per electrode, wherein said insulator prevents flow of direct current from the conducting electrodes to the skin of said user and a capacitive coupling over said insulator is formed between said conducting electrodes and the skin of said user.

15. A haptic notification method comprising:
receiving a notification over a wireless network from a remote device;
encoding said notification as a plurality of haptic stimuli;
providing means for stimulating the skin of a user with said plurality of haptic stimuli, wherein said haptic stimuli are perceived by said user as a coordinated sensation.

\* \* \* \* \*